(12) United States Patent
Doi et al.

(10) Patent No.: US 8,437,232 B2
(45) Date of Patent: May 7, 2013

(54) HIGH FREQUENCY MODULATOR

(75) Inventors: Akihiko Doi, Tokyo (JP); Shengyuan Li, Dallas, TX (US); Indumini Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 109 days.

(21) Appl. No.: 12/633,072

(22) Filed: Dec. 8, 2009

(65) Prior Publication Data

US 2010/0315937 A1 Dec. 16, 2010

Related U.S. Application Data

(60) Provisional application No. 61/186,208, filed on Jun. 11, 2009, provisional application No. 61/186,303, filed on Jun. 11, 2009.

(51) Int. Cl.
*G11B 7/00* (2006.01)
(52) U.S. Cl.
USPC ........................... 369/53.26; 369/116

(58) Field of Classification Search ............... 369/53.26, 369/116
See application file for complete search history.

(56) References Cited

U.S. PATENT DOCUMENTS

2007/0030785 A1* 2/2007 Masui et al. ............... 369/59.13
2011/0038242 A1* 2/2011 Rees et al. .................. 369/47.35

* cited by examiner

*Primary Examiner* — Latanya Bibbins
(74) *Attorney, Agent, or Firm* — Alan A. R. Cooper; Wade J. Brady, III; Frederick J. Telecky, Jr.

(57) ABSTRACT

A high frequency modulator is described. It comprises: a first converter for receiving a constant current signal and transmitting a first converted signal; an adder coupled the first converter and operative for transmitting a summed signal in response to receiving the first converted signal and selectively receiving a triangular signal; a first oscillator coupled to the adder for receiving the summed signal, the first oscillator operative for transmitting a time varying current signal; a second converter coupled to the first oscillator for receiving the time varying current signal and operative for transmitting a second converted signal; and an output device selectively coupled to the second converter and operative for transmitting an output signal in response to receiving either the second converted signal or an offset signal.

14 Claims, 5 Drawing Sheets

HIGH FREQUENCY MODULATOR

CROSS REFERENCE TO RELATED APPLICATION(S)

The present application claims priority to jointly owned U.S. Provisional Application corresponding to application No. 61/186,208 entitled, "Dynamic High Frequency Modulator Control System." This provisional application was filed on Jun. 11, 2009. The present application also claims priority to jointly owned U.S. Provisional Application corresponding to application No. 61/186,303 entitled, "High Frequency Enable Control System." This provisional application was filed on Jun. 11, 2009.

DESCRIPTION OF RELATED ART

With the evolution of electronic devices, there is a continual demand for enhanced speed, capacity and efficiency in various areas including electronic data storage. Motivators for this evolution may be the increasing interest in video (e.g., movies, family videos), audio (e.g., songs, books), and images (e.g., pictures). Optical disk drives have emerged as one viable solution for supplying removable high capacity storage. When these drives include light sources, signals sent to these sources should be properly processed to reduce potential damage in appropriate light emission.

BRIEF DESCRIPTION OF THE DRAWINGS

A high frequency modulator may be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

Figure 1A:
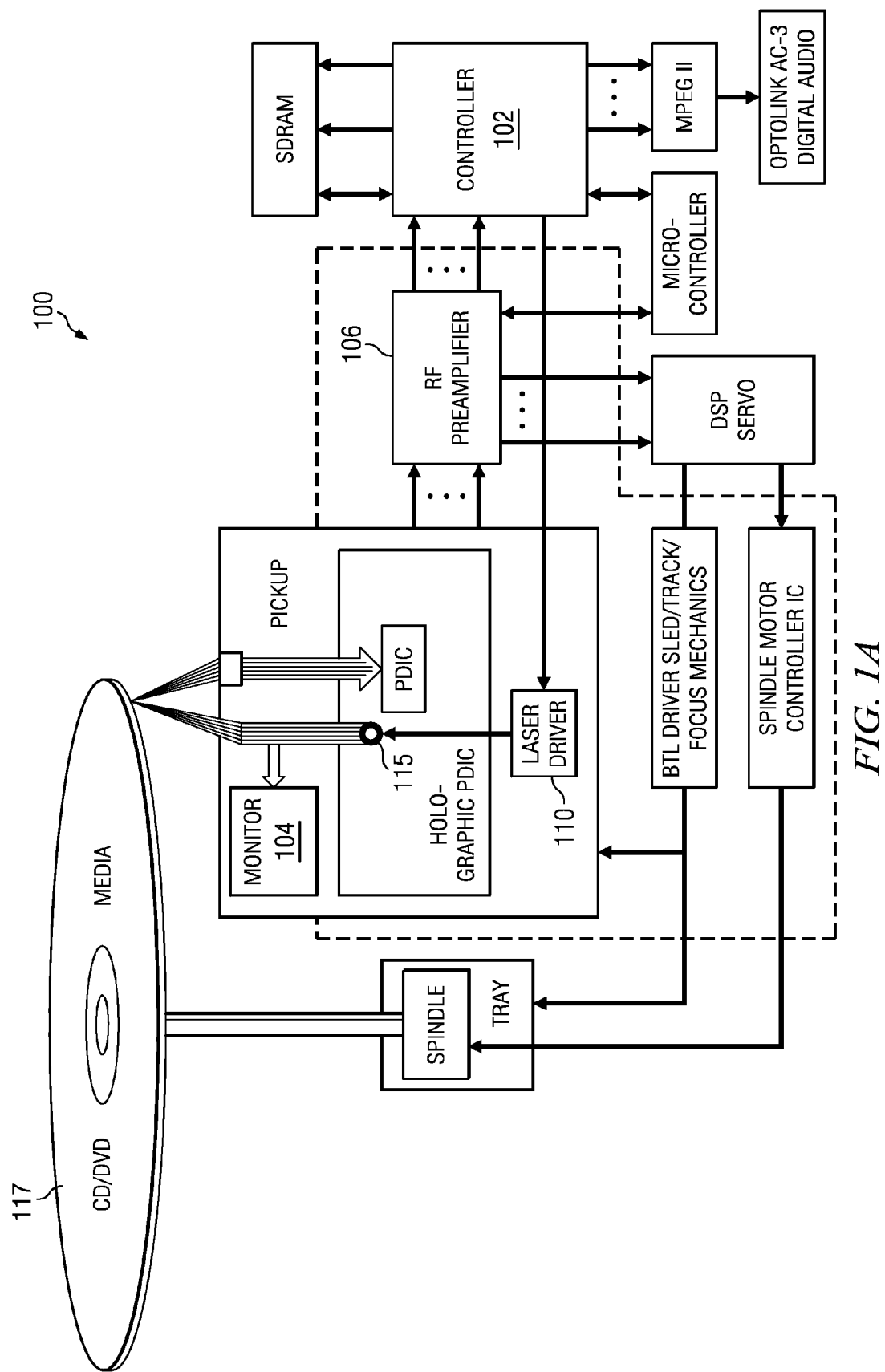
FIG. 1A is a system drawing illustrating components within an optical disk drive.

While the high frequency modulator is susceptible to various modifications and alternative forms, specific embodiments have been shown by way of example in the drawings and subsequently are described in detail. It should be understood, however, that the description herein of specific embodiments is, not intended to limit the high frequency modulator to the particular forms disclosed. In contrast, the intention is to cover all modifications, equivalents, and alternatives falling within the spirit and scope of the high frequency modulator as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

Turning now to FIG. 1A, is a system drawing illustrating components within an optical disk drive 100. A controller 102 monitors the output light power level of a laser diode 115 using a Monitor PD 104, or monitor photodiode, and an RF, or radio frequency, preamplifier 106. This controller can keep an expected power level by changing an input control current of a laser driver 110 through an APC, or auto power controlling, feedback loop, even if a light source 115 such as a laser diode, has many changes of the output power due to various condition changes, such as temperature etc.

Also, the controller 102 sets the enable signal for switching some current channels of the laser driver 110, which arranges a data writing pulse. In the case of data reading, the controller 102 may only set the DC current by disabling the switching and applying the indicated input current. In the case of data writing, the controller 102 applies some adjustment signals, or enable-switching signals, to arrange the writing pulse waveform as a combination of switching timing, which also changes the power level by different indicated current of each channel. The controller 102 can arrange these indicated currents based on the Monitor PD 104 output with some detecting function in the RE preamplifier 106. At the very least, this controller has two controlling levels for the reading power and the writing power. Sometimes the controller may get the top, bottom, or average level of a writing pulse and calculate to control some power levels independently.

As illustrated in this figure, the laser driver 110 sends a signal that prompts an associated light source 115 (e.g., laser diode) to emit light. The light source 115 may emit light at any of a number of wavelengths (e.g., 400 nm, 650 nm, 780 nm). Light from this source contacts an associated optical media 117, such as a compact disc (CD), blue ray device (Blu-ray), or digital versatile disk (DVD). Light contacting the optical media can either facilitate data storage or data retrieval from the optical media 117.

Figure 1B:
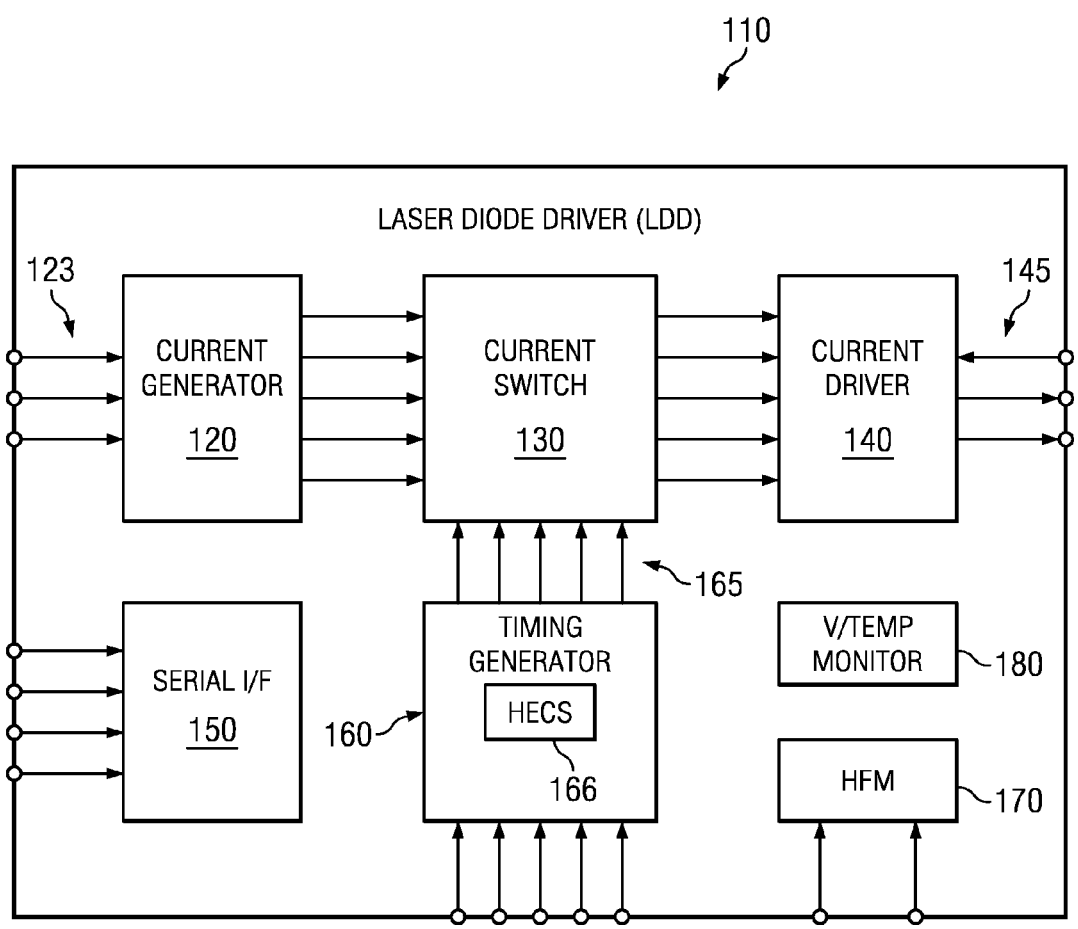
FIG. 1B is an environmental drawing including a laser diode driver current input signal processing system.

FIG. 1B is an enlarged view of the innovative laser driver 110, which may be a laser diode drive (LDD). The LDD 110 is an integrated, fully programmable, multi-function product that controls and drives laser diodes (e.g., light source 115) within optical drives as described with reference to FIG. 1A. More specifically, the LDD 110 can apply the current for the read, write, and erase removable high capacity disks (e.g., capacities greater than approximately 50 Gbytes/disk). The LDD 110 also has low noise (e.g., noise of approximately 0.5 nA/rt-Hz), high speed (e.g., 1 Gb/s, 0.850 Gb/s) and high current (e.g., approximately 1 amp). Any numbers included in this application are for illustrative purposes only and numerous alternative implementations may result from selecting different quantitative values.

At a high level, the LDD 110 may include a current generator 120. Generally, the current generator 120 receives some input signals 123 associated with several input channels, which have an associated input current. This current generator 120 works in tandem with a current driver 140 and produces a gain for the input current. As a result, the current generator 120 and current driver 140 control the amount of current for each output channel 145. For the input signals that the current generator 120 receives, it transmits output signals that a current switch 130 receives. The current switch 130 decides which of the input channels should be turned on or turned off. For the channels that should be turned on, the current switch 130 makes those channels active. Similarly, the current switch 130 inactivates the channels that should be turned off and transmits output signals reflecting this change. The current driver 140 receives these output signals from the current switch 130 as input signals. The current driver 140 is the last current gain stage and drives the laser diodes directly. In other words, the output signals from the current driver 140 also serve as output signals for the LDD 110, which are used in driving the lasers, or the light source 115 (see FIG. 1A).

In addition to the above-mentioned devices, the LDD 110 includes additional components. A serial interface (I/F) 150 has several inputs 155 (e.g., serial data enable, serial data, serial clock) that may be used for an enable, feature selection, or setting the gain. Like the serial interface 150, the timing generator 160 receives various channel enable inputs 165. Though there are five channel enable inputs that are shown in FIG. 1B, the LDD 110 may have any number of channel enable inputs, such as two, six, or the like. The timing generator 160 determines the time at which a given input channel will be either turned on or turned off. The LDD 110 also includes a high frequency modulator (HFM) 170 and voltage/temperature monitor (V/Temp Monitor) 180. The HFM 170 modulates the output current for reducing mode-hopping noise of the laser diodes. The voltage/temperature monitor 190 monitors the laser diode voltage drop and on-chip temperature. One skilled in the art will appreciate that numerous alternative implementations may result from removing any or several of the blocks within the LDD 110.

To accommodate various types of disc, like CD, DVD, and Blu-ray depending on disc type or optical pick up variations, the HFM 170 has setting or adjusting functions for any parameter. When analog switches are available for setting the input voltage signal or input current signal, this HFM can change any parameter and consequently accommodate various disk types and conditions. Dedicating registers for setting parameters also allows adjustment of various parameters.

The HFM 170 may use a standard serial interface like I2C or Serial Port Interface (SPI). It may also have some selection of HFM parameters in the LDD 110. These parameters may include the frequency of HFM, swing of HFM output (e.g., current output amplitude), DC offset cancel current when turning off the HFM, frequency swing of spread spectrum function, and cycle time of the spread spectrum function. All of these parameters may be set depending on the disc type using the serial interface as subsequently described.

When reading data from the optical disk 117, the LDD 110 may be turned on with both HFM current and DC current. Adding the HFM current decreases the coupled noise due to small light reflections from the optical disc 117. This addition also cuts the continuous-time phase of the laser diode output light. These HFM parameters depend on the disc type and the condition of the optical pick up unit. Therefore, the parameters change depending on the disc type or any condition.

Figure 2A:
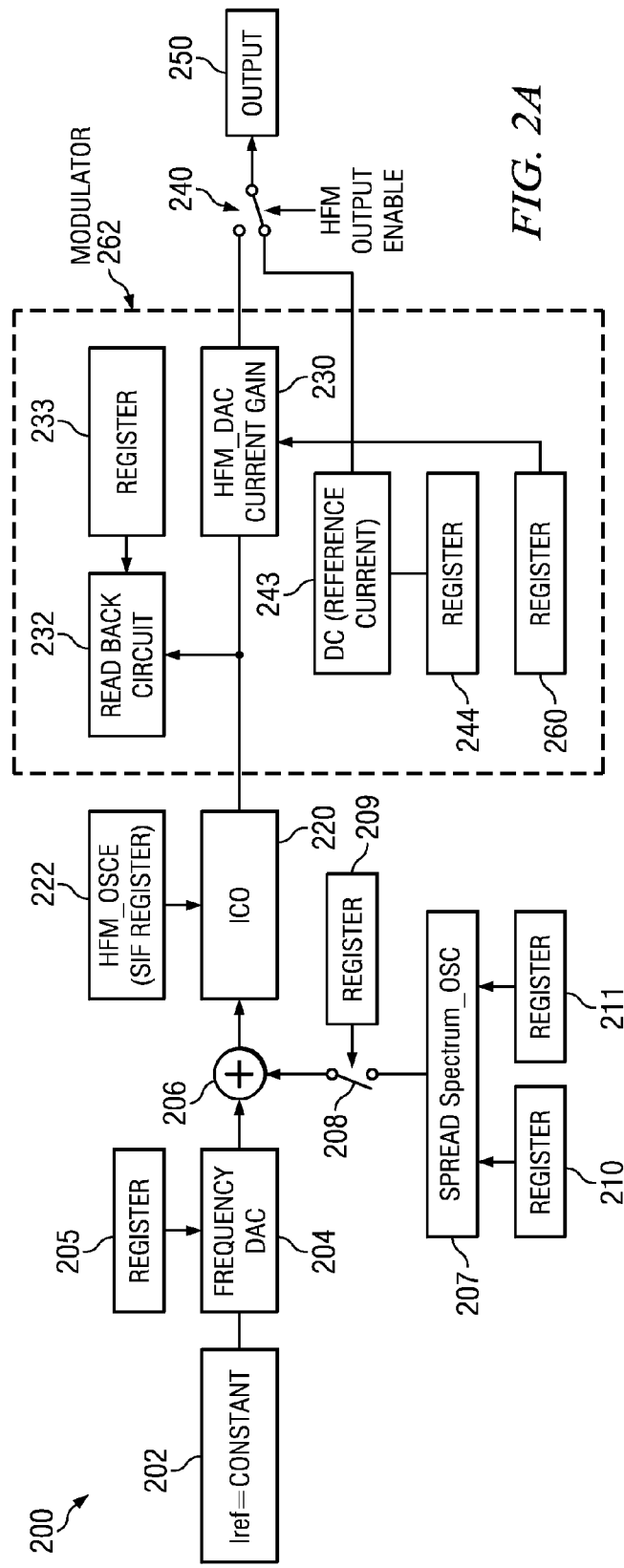
FIG. 2A shows the spectrum of HFM output with spread spectrum.

FIG. 2A is a block diagram 200 of one implementation of the HFM 170 that includes a digital current source 202 for transmitting a current signal associated with a reference current; this current source may be any type of device such as CMOS, BJT, etc. The reference current may be a constant current, such as a current of approximately 1 mA. A first converter 204 receives the current signal from the current source 202. This digital to analog converter may be implemented with any type of device such as CMOS, BJT etc. The frequency converter 204 may also receive a frequency range bit setting from a register 205; this register may be any type of register, such as a DFF etc. In addition the frequency range may be a frequency such as approximately between 300 MHz to 1000 MHz, approximately between 180 MHz to 600 MHz, or the like. Any numbers included in this application are for illustrative purposes only and numerous alternative implementations may result from selecting different quantitative values. The converter 204 transmits a converted signal with a frequency of approximately the reference frequency.

A summing device or circuit 206 receives the converted signal from the frequency converter 204; in one implementation this summing device may be an adder. A switch 205 may connect the adder 206 to an oscillator 207; a register 209 may control the opening and closing of the switch 208. Like the register 205, this register may be any type of register such as a DFF register. The switch 208 may be any type of switch, such as a CMOS switch. In addition, the register 209 may transmit an enable signal that controls the switch and also impact the current consumed by the HFM 170. Registers 210-211 also connect to the oscillator 207. The register 210 may transmit the frequency setting for a spread spectrum operation, as described with reference to FIG. 3B. The register 211 may transmit the amplitude setting for the spread spectrum operation, as described with reference to FIG. 3B.

Figure 3A:
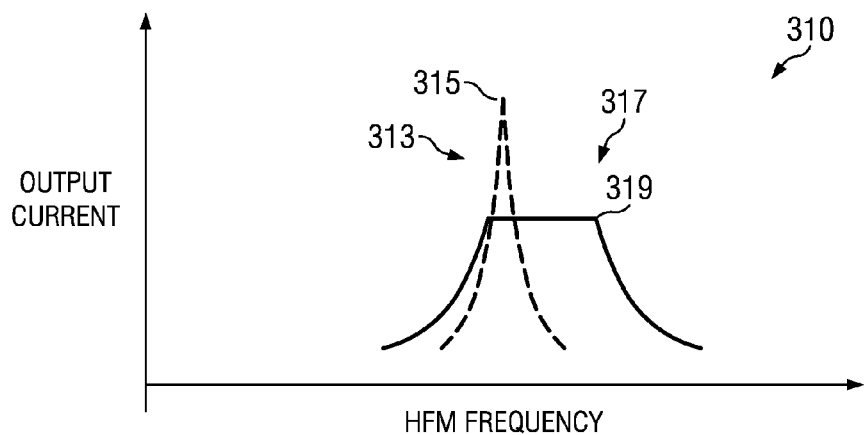
FIGS. 3A-3B illustrate the impact of the DC offset current when the HFM output current is turned on/off.
Figure 3B:
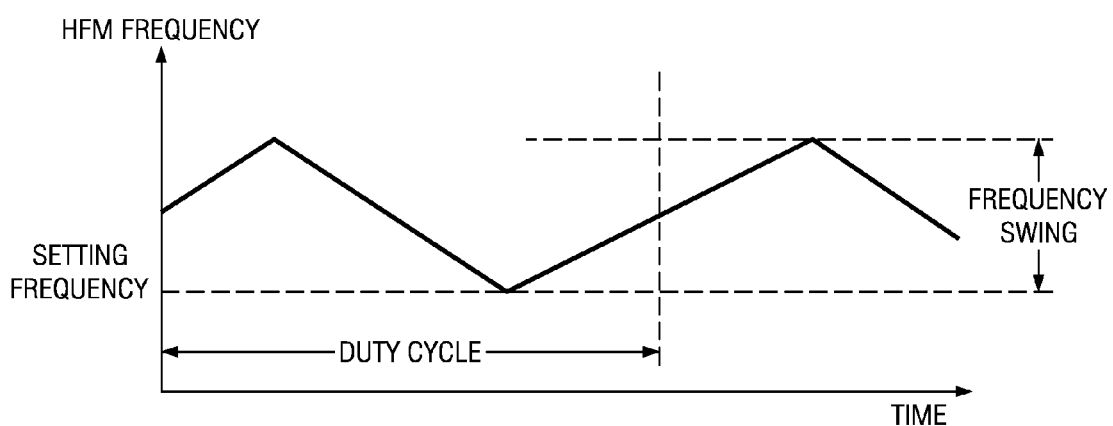

Turning now to FIG. 3A, this figure is a graph 310 of the output current spectrum from the HFM 170 as a function of the frequency, such as the frequency from the register 205. The plot 313 illustrates the variation of the output current with frequency for in the absence of a spread spectrum operation, such as when the switch 208 is open. The HFM output current may be oscillated at some high frequency, such as approximately 300 MHz. Since the plot 313 has a single peak 315, this frequency may be one setting parameter depending on the disc type and reading speed. In other words, a CD with a reading speed of 16× may have a different peak frequency than a DVD with reading speed of 8×. In addition, the magnitude of the peak 315 may be the swing of the HFM 170, which may depend on the disc type and optical pick up characteristics. The swing of the HFM 170 may generally refer to oscillation amplitude.

Figure 2B:
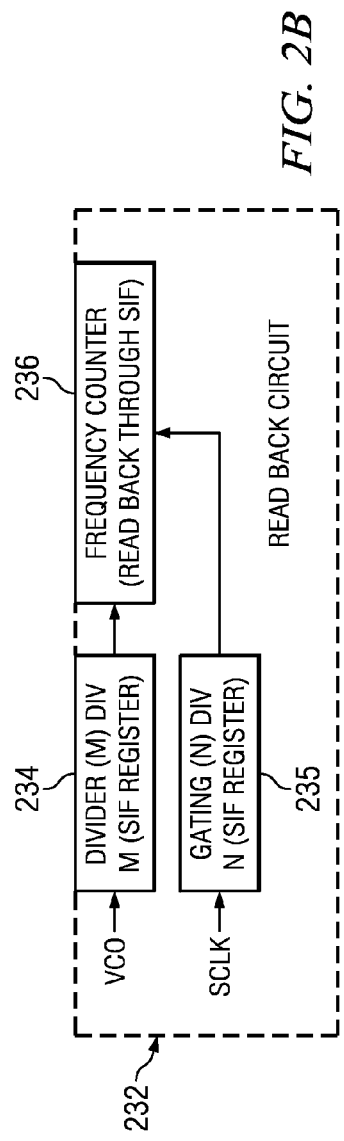
FIG. 2B shows the frequency of HFM output in the time domain.

In contrast to the plot 313, the plot 317 illustrates the variation of the output current with the frequency with the spread spectrum operation, such as when the switch 208 is closed. Using the spread spectrum operation may decrease the peak of radiation noise that the HFM 170 emits. For the spread spectrum operation, the frequency swing and cycle time may also be set depending on the disc type and other conditions, such as laser aging etc. As illustrated, the energy of the peak 315 gets spread out with a reduced maximum value that generates the peak 319. This reduction in output current may decrease the peak of radiation noise that the HFM 170 emits to meet the EMI (Electromagnetic Interference) objectives. FIG. 2B shows the frequency of the HFM output current in the time domain. This plot illustrates both the frequency swing and the duty cycle. The frequency swing and duty cycle may be set depending on the disc type and other conditions, such as laser aging etc.

Returning to FIG. 2A, the oscillator 207 may transmit an oscillation current signal having a frequency and amplitude associated with the signals received from the registers 210-211. In one implementation, the oscillation current signal may be a low frequency signal, such as a frequency of approximately 300 KHz. In an alternative implementation, the oscillation current signal may be a triangular signal or a spread signal. As mentioned above, the summing device 206 receives the oscillation current signal when the switch 208 is closed. This summing device transmits a summed signal to the oscillator 220, which receives an enable signal from the register 222. This oscillator may be a current controlled oscillator (ICO) which has high frequency and wide dynamic range capability, such as from approximately 180 MHz to approximately 1 GHz. The register 222 may transmit an enable signal for either activating or deactivating the oscillator 220. The oscillator 220 may transmit a current signal, such as a time a varying current signal; this signal may be an AC reference current.

A converter 230 and a read back circuit 232 receive the time varying current signal; a register 233 may transmit an enable signal for activating or deactivating this counter. In one implementation, the read back circuit 232 may a frequency counter that measures a relative ratio between an output frequency of HFM 170 and a clock from the serial interface 150. In case there is a big condition change such as long writing time, big temperature change, or the like, the HFM 170 can measure this condition change as an actual output frequency. If there is an error of this frequency, one can then adjust some parameters such as block 204 and/or 205 to bring it back. The output signal from this frequency counter may have a certain read back frequency.

Turning now to FIG. 2B, this figure is a block diagram of one implementation of the read back circuit 232. In this implementation, this counter may receive a clock signal, such as a clock signal from serial interface; the read back circuit 232 may also receive another frequency signal, such as from the ICO 220. A divider 234, such as an M divider where M is the frequency divider ratio may receive the ICO output signal. A divider 235, such as N where N is the frequency divider ratio may receive the serial interface clock signal. Though, not shown each of the dividers may receive a signal from an associated register. A frequency counter 236 receives divided signals from the divider 234 and the divider 235.

The converter 230 also receives a signal from the register 260. This converter has a current gain that can change the swing of the oscillator 220 by changing the current gain. The register 260 may transmit a gain signal that produces the current gain for the converter 230. The converter 230 transmits a converted signal. In one implementation, this converted signal may represent a current modulated signal, where this converter determines how current modulation is associated with this current modulated signal. Collectively, the read back circuit 262, converters 230 and 243, and registers 233, 244, and 260 can comprise at least a portion of a modulator.

The switch 240 may selectively pass the current modulated signal to an output device or circuit 250. In one implementation, the output device 250 may be an adder, a summer, or the like. In addition, this switch receives an HFM modulation enable signal that may come from a high frequency enable control system (HECS) 165 within the timing generator 160 as shown in FIG. 1B.

A converter 243 connects to the switch 240; when this switch is in one position, it may pass a converted signal from the converter 243 to the output device 250. A register 244 transmits a signal to the converter 243; this signal may be a DC offset current for cancellation when HFM 170 is turned off. In one implementation, the converter 243 may be a digital to analog converter. Another implementation may have a converted signal associated with a DC offset signal. This DC output current may compensate for the DC power level difference associated with turning the HFM 170 on or off.

Figure 4A:
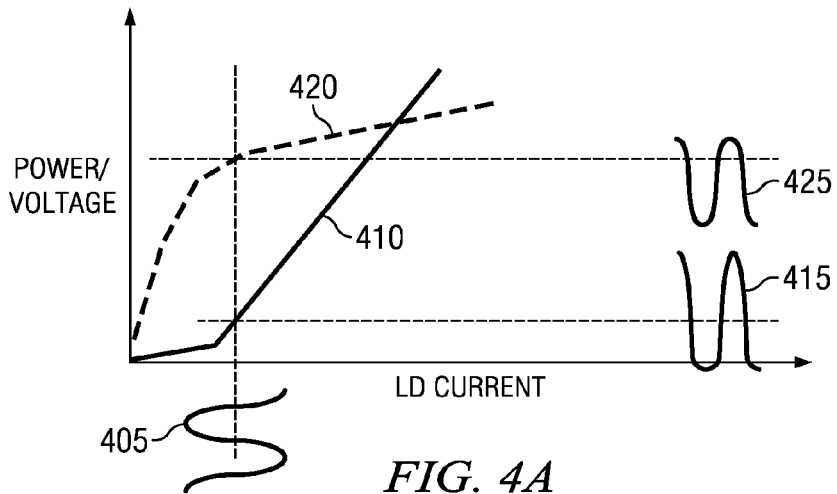
FIG. 4 is one implementation of this concept in LDD application.
Figure 4B:
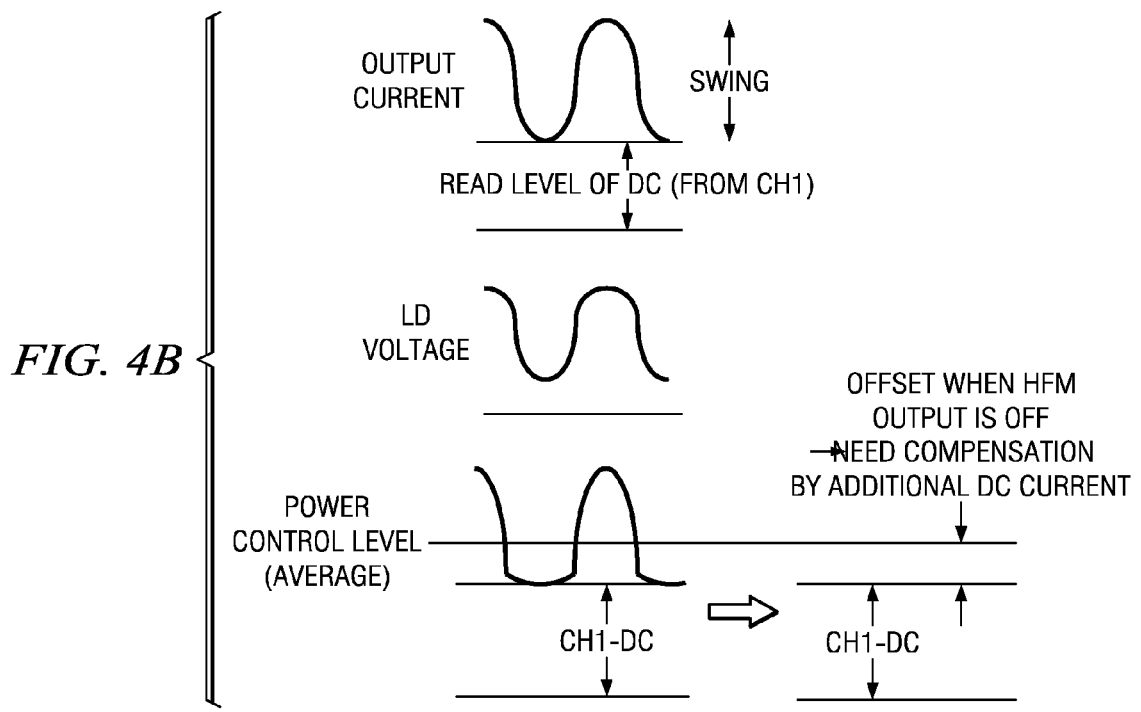

FIGS. 4A-4B illustrate the impact of the DC offset current when the HFM output current is either turned on/off. The HFM 170 may output a sinusoidal current 405 to the LDD 110. Due to a non-linear relation between the LDD current and LDD output light power as indicated by the curve 410, there may be some distortion at the output light power, like the wave form 415. Similarly, due to the non-linear relation between the LD current and LD voltage as indicated by the curve 420, there some distortion at the LD voltage, like the wave form 425.

Now, when the HFM modulation output is turned off (e.g., switch 240 connects the converter 243 to the output device 250), with the applied offset current from 243 one has essentially the same DC power level at LD as shown in FIG. 4B. This is beneficial to get the correct writing marks with the same write optical power whether the modulation is on or off with the offset current.

There may be some distortion of the output light power wave form that comes from non-linearity of LDD 110. The HFM 170 may set the amount of this offset compensation current through serial interface indication and may use an enable function. One enable may enable or disable the HFM before passing it to the LDD 110. A switch 240 may connect to either the converter 230, which enables the HFM 170, or the converter 243 or the DC offset compensation current; this may be considered as disabling the HFM. A switch 208 may either enable or disable the spread spectrum operation using an enable from the register 209. Finally, an enable signal from the register 222 may enable and disable of all functions of HFM system by controlling operation of the oscillator 220.

While various embodiments of the high frequency modulator have been described, it may be apparent to those of ordinary skill in the art that many more embodiments and implementations are possible that are within the scope of this system. Although certain aspects of the high frequency modulator may be described in relation to specific techniques or structures, the teachings and principles of the present system are not limited solely to such examples. All such modifications are intended to be included within the scope of this disclosure and high frequency modulator and protected by the following claim(s).

The invention claimed is:

1. A high frequency modulator (HFM) comprising:
   a first converter for receiving a constant current signal and transmitting a first converted signal;
   an adder coupled the first converter and operative for transmitting a summed signal in response to receiving the first converted signal and selectively receiving a triangular signal;
   a first oscillator coupled to the adder for receiving the summed signal, the first oscillator operative for transmitting a time varying current signal;
   a second converter coupled to the first oscillator for receiving the time varying current signal and operative for transmitting a second converted signal; and
   an output circuit selectively coupled to the second converter and operative for transmitting an output signal in response to receiving either the second converted signal or an offset signal.

2. The HFM of claim 1, wherein the HFM further comprises a first switch coupled to the adder and operative for selectively transmitting the triangular signal.

3. The HFM of claim 2, wherein the HFM further comprises a second oscillator for transmitting the triangular signal to the first switch.

4. The HFM of claim 1, wherein the HFM further comprises a frequency counter coupled to the first oscillator for receiving the time varying current signal, wherein the frequency counter transmits a read back frequency signal.

5. The HFM of claim 4, wherein the HFM further comprises a plurality of dividers that are each coupled to the frequency counter, wherein at least one of the plurality of dividers is coupled between the first oscillator and the frequency counter so as to receives the time varying current signal.

6. The HFM of claim 4, wherein the frequency counter transmits the read back signal in response to a clock signal and the time varying current signal.

7. The HFM of claim 1, wherein the second converter current modulates the time varying current signal.

8. The HFM of claim 1, wherein the HFM further comprises a third converter for transmitting a third converted signal.

9. An apparatus comprising:
a converter for receiving a constant current signal and transmitting a first signal;
a first oscillator for transmitting a spread signal;
a summing circuit for transmitting a summed signal in response to either receiving the first signal, or receiving the first signal and the spread signal;
a second oscillator coupled to the summation device for receiving the summed signal, wherein the second oscillator is operative for transmitting a second signal;
a modulator coupled to the second oscillator for receiving the second signal, the modulation device operative for transmitting a modulated signal; and
an output device selectively coupled to the modulator and operative for transmitting an output signal in response to receiving either the modulated signal or an offset signal.

10. The apparatus of claim 9, further comprising a frequency counter coupled to the second oscillator for receiving a time varying current signal, wherein the frequency counter transmits a read back frequency signal.

11. The apparatus of claim 10, further comprising a plurality of dividers that are each coupled to the frequency counter, wherein at least one of the plurality of dividers is coupled between the first oscillator and the frequency counter so as to receives the time varying current signal.

12. The apparatus of claim 10, wherein the frequency counter transmits the read back signal in response to a clock signal and the time varying current signal.

13. The apparatus of claim 9, further comprising a second converter for transmitting the offset signal.

14. An optical disk drive system comprising:
a controller monitoring an output power lever of laser diode and transmitting adjustment signals for varying the output power level;
a driver operatively coupled to the controller for receiving the adjustment signals, the laser driver having a frequency modulation control system that includes:
a first converter for receiving a constant current signal and transmitting a first converter for receiving a constant current signal and transmitting a first converted signal;
an adder coupled to the first converter and operative for transmitting a summed signal in response to receiving the first converted signal and selectively receiving a triangular signal;
a first oscillator coupled to the adder for receiving the summed signal, the first oscillator operative for transmitting a time varying current signal;
a second converter coupled to the first oscillator for receiving the time varying current signal and operative for transmitting a second converted signal; and
an output device selectively coupled to the second converter and operative for transmitting an output signal in response to receiving either the second converted signal or an offset signal.

* * * * *